United States Patent
Verwey et al.

(10) Patent No.: US 6,221,429 B1
(45) Date of Patent: *Apr. 24, 2001

(54) FLUORINATED POWDER COATINGS HAVING IMPROVED GLOSS

(75) Inventors: Edwin Verwey, Leiden; Ludwig Karl Rijkse, Eh Hoofddorp, both of (NL); Michel Gillard, Corroy-le-Chateau (BE)

(73) Assignee: Fina Research, S.A., Feluy (BE)

( * ) Notice: Subject to any disclaimer, the term of this patent is extended or adjusted under 35 U.S.C. 154(b) by 0 days.

This patent is subject to a terminal disclaimer.

(21) Appl. No.: 09/197,120

(22) Filed: Nov. 20, 1998

Related U.S. Application Data

(63) Continuation of application No. 08/784,489, filed on Jan. 17, 1997, now abandoned, which is a continuation of application No. 08/356,803, filed on Dec. 15, 1994, now abandoned.

(30) Foreign Application Priority Data

Dec. 23, 1993 (BE) .................................................. 93870243

(51) Int. Cl.$^7$ ........................ C09D 127/16; C09D 133/12
(52) U.S. Cl. .......................... 427/195; 524/520; 525/199
(58) Field of Search ........................... 427/195; 524/520; 525/199

(56) References Cited

U.S. PATENT DOCUMENTS

| 4,659,768 | * | 4/1987 | Tortorello | 525/158 |
| 5,030,394 | * | 7/1991 | Sietses | 264/28 |
| 5,229,460 | * | 7/1993 | Yousuf | 525/199 |
| 5,599,873 | * | 2/1997 | Verwey | 525/199 |

FOREIGN PATENT DOCUMENTS

193374 * 7/1992 (JP) .

* cited by examiner

Primary Examiner—David J. Buttner
(74) Attorney, Agent, or Firm—William D. Jackson; Jim D. Wheelington

(57) ABSTRACT

Pigmented powder coating products based on low melting point fluorine-based terpolymers, preferably on those made from a majority of vinylidene fluoride copolymerized with tetrafluoroethylene and hexafluoropropene, are capable of providing coatings with controllable gloss properties. The process for preparing coatings from the powders is essentially characterized by the selection of the temperature at which the desired gloss can be obtained, from low to high, without degradation of the mechanical properties.

19 Claims, No Drawings

FLUORINATED POWDER COATINGS HAVING IMPROVED GLOSS

CROSS REFERENCE TO RELATED APPLICATION(S)

This is a continuation application of prior application Ser. No. 08/784,489 filed Jan. 17, 1997 now abandoned, which in turn is a continuation application of prior application Ser. No. 08/356,803, filed Dec. 15, 1994, now abandoned, which claims priority of its copending Belgian application, Serial Number 93870243.8, entitled "Fluorinated powder coatings having regulable gloss", filed Dec. 23, 1993; which previously filed application(s) is/are hereby incorporated in its/their entirety(ies) by reference.

BACKGROUND OF THE INVENTION

The present invention related to fluorinated powder coating products, based on certain vinylidene fluoride terpolymers (hereinafter referred to as VdFT), for preparing fluorinated coatings having controllable gloss and to a process for coating a substrate with a pigmented fluorinated coating having controllable gloss. In particular, the present invention relates to the use of certain vinylidene fluoride terpolymers in pigmented powder coating products, for obtaining fluorinated protective coatings having controllable gloss properties.

Coatings based on vinylidene fluoride homopolymers (hereinafter PVdF) are known to be very useful as protective coatings for a variety of substrates due to their good chemical and weather resistance and to the thermal stability of PVdF. The general known technique used for preparing PVdF coatings is to prepare a dispersion of PVdF in a suitable solvent for application by known means onto the required substrate, and thereafter subjecting it to heat treatment.

The solvent used is generally known in the prior art as "latent solvent", and it is described therein as an organic solvent which has no significant action on PVdF at room temperature, but which at an elevated temperature exerts a sufficient solvent action.

However, although the known systems may give good results, environmental protection laws throughout the world, but mainly in Europe and the USA, are making it increasingly difficult to utilize solve-based systems. Further, the recovery of the solvent is a costly procedure. Accordingly, there is a need in the art for solventless PVdF-based coatings.

British Patent GB 2194539-A, to Labofina discloses pigmented PVdF-based powder coating products consisting essentially of vinylidene fluoride homopolymers (or copolymer with at most 10 wt % of comonomer units), one or more compatible thermoplastic resins and one or more pigments. It also discloses a process for preparing the products. However, the gloss obtained is not easily controlled at an acceptable level.

European patent No. 456018-A, to Atochem North America discloses pigmented powder coatings of vinylidene fluoride/hexafluoropropene copolymers, the resin component comprising 50–90 wt % of said copolymers having a melt viscosity of 1–4 kPoise [100–400 Pa-s] at 100 $s^{-1}$ and 232° C., said copolymers being characterized by a melting point in the range of about 160° C. to about 170° C. (which closely approaches the melting point of PVdF), and 50–10 wt % of thermoplastic acrylic resin. The resulting coatings are said to be characterized by improved flexibility, crack resistance and surface smoothness (as opposed to surface roughness or "orange peel" associated with the finish) while not requiring the inclusion of a flow-improving agent. No information is reported about the gloss, not to mention gloss regulation, except that the thermoplastic acrylic resin is responsible for gloss durability.

U.S. Pat. No. 5,229,460 to Evodex discloses fluoropolymer-based powder coatings which may be based on PVdF or on a copolymer with at least 80 wt % of vinylidene fluoride and up to 20 wt % of at least one other fluorine-based monomer. No information is reported about the gloss nor about gloss regulation.

There is, however, a certain demand for coatings exhibiting very low gloss, which cannot be obtained presently. Accordingly, there is a need for a process for regulating the gloss of fluorinated powder coatings.

An object of the present invention is to provide VdFT-based powder coating compositions capable of providing easily controllable low-gloss coatings. Controllable gloss coatings, as used herein, are coatings whose gloss can be adjusted from values from above 40, preferably above 50 and most preferably above 60, down to values below 30, preferably below 20 (all values being measured according to ISO 2813 at an angle of 60°), while still having a good surface smoothness.

Another object of the present invention is to provide VdFT-based powder coating compositions capable of providing low-gloss coatings. Low-gloss coatings, as used herein, are coatings having a gloss below 30, preferably below 20 (all values being measured according to ISO 2813 at an angle of 60°), while still having a good surface smoothness.

A further object is to provide a process for preparing controllable gloss VdFT-based coatings.

Still another object is to provide a process for preparing low-gloss VdFT-based coatings.

SUMMARY OF THE INVENTION

Accordingly, the present invention provides a powder coating product consisting essentially of:
 (a) a resin component consisting essentially of:
  (i) from 60 to 90 wt % of one or more low melting point fluoride-based terpolymers;
  (ii) from 40 to 10 wt % of one or more compatible resins; and
 (b) from 1 to 35 parts by weight of one or more pigments per 100 parts by weight of the resin component.

The present invention further provides a process for preparing coatings from the powder coating products of the invention, essentially characterized by a selection of the baking temperatures.

DESCRIPTION OF THE PREFERRED EMBODIMENTS

The low melting point fluorine-based terpolymers used herein are made from three monomers selected from he group consisting of vinylidene fluorine (VdF), tetrafluoroethylene (TFE), chlorotrifluoroethylene, vinylfluoride, hexafluoropropene (HFP), and $CF_3$—$CF_2$—$CF$=$CF_2$; and having a melting temperature below about 150° C., preferably below 120° C. and most preferably below 100°. Preferably the terpolymer is made from a majority of VdF copolymerized with TFE and HFP; the most preferred terpolymers are prepared from 65 to 85 wt % of VdF monomer units with from 7.5 to 17.5 wt % of each of TFE and HFP. The melt viscosity of the terpolymer should preferably be of from 9,000 to 15,000 dPa-s, most preferably from 11,000 to 13,000 dPa-s, all measured at 125° C.

The VdFC is mixed with one or several compatible resins, preferably of the acrylic type. Acrylic resins are known in the art and need not be described here; a description may be found in French Patent 2,636,959-A to Atochem (see line 18 of page 3 to line 14 of page 4). As examples of thermosetting acrylic resin, there are those described in U.S. Pat. No. 4,659,768 to Tortorello, particularly under the denominations "Experimental resin" and "control resin". However, it has been found that it is advantageous to use a thermoplastic acrylic resin, and most advantageous to use a thermoplastic polymethylmethacrylate (PMMA) resin. A preferred thermoplastic PMMA resin is that obtained by (co) polymerization of at least 75 wt % of an alkyl methacrylate, the other comonomers being one or several olefinically unsaturated comonomers, preferably of the alkyl (meth) acrylate type. These esters are formed by the reaction of the acrylic or methacrylic acid with suitable alcohols, for example, methyl alcohol, ethyl alcohol, propyl alcohol, butyl alcohol and 2-ethylhexyl alcohol. Generally, the larger the alcohol portion of the ester, the softer and more flexible the resultant resin. Also, generally, the methacrylic esters form harder films than the corresponding acrylic esters. Examples of such resins include polymethylmethacrylate, copolymers of methylmethacrylate with ethyl acrylate, butyl methacrylate, isobutyl methacrylate, acrylic acid or methacrylate acid, and the like. The most preferred PMMA resins are those which exhibit a viscosity of from 7 to 17 P in 40% solution in a 95:5 by weight mixture of toluene and ethylene glycol methyl ether.

The weight ratio of the VdFC to the compatible resin may vary widely from 90:10 to 60:40, preferably from 75:25 to 65:35, most preferably of about 70:30.

The resin component may additionally contain minor amounts of the usual additives, such as an antioxidant, a flow promoting agent, a UV absorber, and/or an adhesion promoter. As suggested in U.S. Pat. No. 5,229,460, an antioxidant may be utilized to enhance heat stability and provide protection against thermal degradation and discoloration of the coating film due to excessive heat at high curing temperatures; also, the use of Kynar ADS® as substitute for flow promoting agent is disclosed.

The use of pigments in the coating composition is preferable. Indeed, if no pigment is used, a clearcoat or varnish can be obtained; however, the resulting coating is unevenly milky, which is undesirable. Further, such clearcoats have a lesser resistance to high temperatures, and most importantly, they insufficiently absorb ultraviolet light which would contribute to the degradation of the primer (if any). The use of ultrafine titanium dioxide to absorb ultraviolet light is known commercially.

When pigments are required, any pigment or combination of pigments may be utilized, and the choice of pigments should preferably be made in accordance with what is known in the art to PVdF-based coatings. The amount of pigment used may vary widely according to its hiding power. For example, a white topcoat prepared exclusively with titanium dioxide may require up to about 35 wt % of pigment. Other pigments with better hiding properties may require lower amounts.

The process of preparing the powder coating product comprises the steps of:
    (a) melt-mixing the VdFC, the compatible resin components and the pigments;
    (b) forming pellets; and,
    (c) grinding the pellets.

Melt-mixing is normally carried out by extrusion. Extruding and granulating the resulting mixture is performed by the usual procedures which are easily determined by one skilled in the art. In particular, a single or double screw extruder is utilized at a processing temperature of from 100° C. to 130° C. The dimensions of the pellets are usually about 3 mm in diameter and 2 mm in length.

Grinding the pellets is done by any suitable means which allows suitable sized particles to be obtained, which techniques are known to those skilled in the art and need not be described in detail. For example, U.S. Pat. No. 5,229,460 contains a discussion of the state of the art of grinding fluoropolymer-based thermoplastic blends and the influence of the cooling step thereon.

The finished powder should comprise particles of size and shape suitable for achieving constant flow through the application equipment, mainly in order to obtained a constant thickness of coating. It is preferred that the shape of the particles be as spherical as possible and their size as uniform as possible so that the resulting powder will have better flow properties. Regarding the size of the particles, the grinding step is combined with a sieving step for eliminating the largest size particles, i.e., those particles exceeding about three times the desired thickness of the coating. On the other hand, excessively small particles are to be avoided because they are a hazard to health and they tend to block transport lines applications.

The preferred method of grinding utilizes a hammer mill wherein a rotating shaft carries hammers which break the pellets on fixed shapes in the casing of the hammer mill, and hammer them through a sieve lining the bottom of the mill. Sieve openings of about 0.2 mm have been found particularly appropriate.

The resulting powder may be applied on the substrate by any means suitable for achieving an even distribution of the particles, such as, for example, an electrostatic spray application apparatus, whereby the particles receive an electrical charge and then are sprayed onto an oppositely charged substrate. Alternative techniques include cloud chambers, fluidized beds, even triboelectric coating, and the like. Such techniques are well known in the industry and need not be described in great detail.

The VdFC-based powder s preferably applied over a suitable primer coating, commercially available for similar fluorinated coatings, including solvent-based "flash" or powder primers.

After the coating has been applied to the substrate, it must be subject to heat treatment. The coated substrate is passed into a heated oven wherein the coating is baked. An essential feature of the process of the invention is the selection of the temperature enabling control of gloss. The temperature to be selected for obtaining a specific gloss (within experimental variations) is easily determined by one skilled in the art using an oven with a temperature gradient such as is currently used in the coatings industry and need not be described further. This feature is based on the observation that the gloss obtained with the compositions of the invention first increase, then decrease to a low value (as defined herein).

Finally, the coating and its substrate can either be cooled slowly in air or quenched in water.

In order to further illustrate the invention, the following example is given which is intended to be illustrative only and not to limit the scope of the invention. The example shows that the desired gloss, from high values to low values, can be obtained by selecting a baking temperature between about 140° C. (i.e., about 50° C. above the melting temperature) to about 220° C. (i.e., well below the highest temperature at which the polymer is stable). It also shows that better mechanical properties can be obtained than that with PVdF.

EXAMPLE I

The following white-pigmented powder coating composition was prepared:

| | |
|---|---|
| fluorinated polymer | 54.9 pbw (parts by weight) |
| acrylic polymer | 24.3 pbw |
| titanium dioxide | 21.1 pbw |
| | 100.0 |

The fluorinated polymer is a terpolymer consisting of about 75 wt % of VdF monomer units and about 12.5 wt % of each of HFP and TFE monomer units (as determined from NMR data by the method of Pianca et al. In Polymer 28, 224, 1987); said polymer having the following properties according to its technical data sheet:

| | | | |
|---|---|---|---|
| melting point | about 90 | ° C. | ASTM D-3418 |
| specific gravity | 1.846 | g/cm3 | ASTM D-792 |
| refractive index ($n_D^{25}$) | 1.384 | | ASTM D-524 |
| tensile strength @ yield | 8 | MPa | ASTM D-882 |
| tensile strength @ break | 15 | MPa | ASTM D-882 |
| elongation @ break | 990 | % | ASTM D-882 |
| tensile modulus | 130 | MPa | ASTM D-882 |

-continued

| | | | |
|---|---|---|---|
| solution viscosity (20 wt % in MEK at 25° C.) | 20 | mPa-s | Brookfield LV #1 spindle @ 30 rpm |
| stability up to | 316 | ° C. | |

The acrylic polymer is a commercially available thermoplastic copolymer of 70 wt % methyl methacrylate monomer and 30 wt % of ethyl acrylate monomer, having a viscosity of about 12 P in 40% solution in a 95:5 by weight mixture of toluene and ethylene glycol methyl ether; containing 3 wt % (relative to the total acrylic polymers) of a low molecular weight copolymer which comprised 30 wt % ethyl acrylate monomer and 70 wt % 2-ethylhexyl acrylate monomer, having a viscosity of about 1.06 Pa-s at 98.9° C.

The resulting mixtures were extruded under the following conditions, giving pellets of 3 mm in diameter and about 2 mm in length:

twin screw extruder screw rotation: 200 rpm load: 85% temperature profile: 100° C. at hopper exit, rising to 130° C. in the middle of the screw, then 115° C. up to the end of the screw;

temperature of the material at the exit: 15° C.

The pellets were cooled in liquid nitrogen down to about 150° C., then ground at a temperature of about 100° C. in a hammer mill and sieved to eliminate particles larger than about 150 μm. In the hammer mill, a rotation shaft carries hammers which break the pellets on fixed shapes in the casing of the hammer mill and hammer them through a sieve lining at the bottom of the hammer mill. The particle size distribution was measured and 99% of the particles had a size below 90 μm, with 40% below 32 μm. Only 5% had a size below 15 μm.

The resulting powders were applied by an electrostatic spray process on both sides of a 1 mm thick rolled steel plate previously covered by a 50 μm layer of an epoxy primer. The epoxy primer had been prepared and applied according to Example 1 of Applicants' European Patent No. 404752A.

Two coated substrates were then heated 20 minutes in a temperature-gradient oven, giving top coatings of 80 μm thickness.

The following results were obtained in the two separate determinations:

| I. | | | | | | | | | | |
|---|---|---|---|---|---|---|---|---|---|---|
| Temperature (° C.) | | 121 | 126 | 131 | 138 | 144 | 157 | 164 | 171 | 179 |
| Gloss (60° C. ISO-2813) | 49 | 56 | 59 | 62 | 60 | 61 | 55 | 51 | 44 | 30 |

| II. | | | | | | | | | | |
|---|---|---|---|---|---|---|---|---|---|---|
| Temperature (° C.) | | 149 | 158 | 168 | 177 | 188 | 199 | 210 | 222 | 235 | 249 |
| Gloss (60° C. ISO-2813) | 50 | 50 | 41 | 26 | 20 | 18 | 16 | 16 | 16 | 16 |

A further coated substrate was baked at 200° C. for 10 minutes and the following properties were measured after cooling:

| | | | |
|---|---|---|---|
| direct impact | >100 | kg.cm | ASTM D-2794 |
| reverse impact | >100 | kg.cm | ASTM D-2794 |
| flexibility (conical mandrel) | 0 | mm | ISO 6860 |
| flexibility (Erichsen) | 7.7 | mm | ISO 1510 |
| adherence | 0 | GT | ISO 2409 |

In the foregoing examples and written description, the following units were abbreviated as indicated:

| Viscosities | Energy |
|---|---|
| Poise—P | Joules—J |
| Pascal-seconds—Pa-s | Joules per gram—J/g |
| Decipascal-seconds—dPa-s | Pressure and Force |
| Millipascal-seconds—mPa-s | Pascals—Pa |
| Megapascal-seconds—MPa-s | Megapascals—MPa |

The following patents are hereby incorporated by reference into this application:
FR 2,636,959-Atochem
US 5,229,460
EP 404752A.

What is claimed is:

1. A process for making and applying a powder coating having controlled gloss properties, said method comprising:
   (a) providing a powder coating product prepared by physically blending a mixture of:
      (i) a resin consisting essentially of from 60 to 90 wt. % of at least one fluorine-based terpolymer having a melting point less than 150° C. and from 40 to 10 wt. % of at least one compatible thermoplastic acrylic resin physically mixed with said terpolymer to provide a product which has temperature-dependent gloss characteristics in which the product, when baked on a substrate surface at a variable temperature within the range of 140–220° C., produces a gloss when measured in accordance with ISO-2813 at an angle of 60°, which is inversely proportional to temperature when baked on a substrate surface over a temperature interval within the range of 140° C.–220° C.
   (b) applying the powder coating product of Paragraph (a) to a substrate surface; and
   (c) baking the powder coating product on the substrate surface of Paragraph (b) at a designated baking temperature and selecting said designated baking temperature at a value within said temperature interval to produce a selected gloss.

2. The process of claim 1 wherein the terpolymer is made from three monomers selected from the group consisting of vinylidene fluoride (VdF), tetrafluorethylene (TFE), chlorotrifluorethylene, vinyl fluoride, hexafluoropropene (HFP) and $CF_3$—$CF_2$—$CF$=$CF_2$.

3. The process of claim 2 wherein the terpolymer is prepared from 65 to 85 wt. % of VFD monomer, from 7.5 to 17.5 wt. % of TFE monomer, and from 7.5 to 17.5 wt. % of HFP monomer.

4. The process of claim 3 wherein said compatible acrylic resin is polymethylymethacrylate.

5. A process for making and applying a powder coating having controlled gloss properties, said method comprising:
   (a) providing a powder coating product prepared by physically blending a mixture of:
      (i) a resin consisting essentially of from 60 to 90 wt. % of at least one fluorine-based terpolymer having a melting point less than 150° C. and from 40 to 10 wt. % of at least one compatible thermoplastic acrylic resin physically mixed with said terpolymer;
   (b) applying the powder coating product of Paragraph (a) to a substrate surface, baking it, and adjusting the gloss properties of the final coating by selecting the baking temperature thereof;
   (c) baking the powder coating product on the substrate surface of Paragraph (b) at a designated baking temperature to produce a first gloss property of the final coating produced by said baking;
   (d) applying a powder coating product of Paragraph (a) to a different substrate surface; and
   (e) baking said powder coating product on the substrate surface of Paragraph (d) at a different designated temperature which is different from the designated temperature of subparagraph (c) to produce a gloss property which is different from the gloss property of the final coating produced in Paragraph (c).

6. The process of claim 5 wherein the terpolymer is made from three monomers selected from the group consisting of vinylidene fluoride (VdF), tetrafluorethylene (TFE), chlorotrifluorethylene, vinyl fluoride, hexafluoropropene (HFP) and $CF_3$—$CF_2$—$CF$=$CF_2$.

7. The process of claim 6 wherein the terpolymer is prepared from 65 to 85 wt. % of VFD monomer, from 7.5 to 17.5 wt. % of TFE monomer, and from 7.5 to 17.5 wt. % of HFP monomer.

8. A process for making and applying a powder coating having controlled gloss properties, said method comprising:
   (a) preparing a powder coating product by physically blending a mixture of:
      (i) a resin consisting essentially of from 60 to 90 wt % of at least one fluorine-based terpolymer having a melting point less than 150° C., and from 40 to 10 wt % of at least one compatible thermoplastic acrylic resin physically mixed with said terpolymer; and,
   (b) applying said powder coating product to a substrate by baking it and adjusting the gloss properties of the final coating by selecting the baking temperature thereof.

9. The process of claim 8 wherein said baking temperature is selected from values between about 140° C. and 220° C.

10. The process of claim 9 wherein said fluorine-based terpolymer consists essentially of about 75 wt % of VDF monomer and about 12.5 wt % each of HFP and TFE monomer.

11. The process of claim 8 further comprising the step of adding to said powder coating product, prior to said applying step, from 1 to 35 parts by weight of at least one pigment per 100 parts by weight of said compatible resin component.

12. The process of claim 8 wherein said at least one terpolymer has a melting temperature below 100° C.

13. The process of claim 8 wherein the terpolymer is made from three monomers selected from the group consisting of vinylidene fluoride (VdF), tetrafluorethylene (TFE), chlorotrifluorethylene, vinyl fluoride, hexafluoropropene (HFP) and $CF_3$—$CF_2$—$CF$=$CF_2$.

14. The process of claim 13 wherein the terpolymer is prepared from 65 to 85 wt. % of VFD monomer, from 7.5 to 17.5 wt. % of TFE monomer, and from 7.5 to 17.5 wt. % of HFP monomer.

15. The process of claim 14 wherein the terpolymer has a melt viscosity of from 9800 to 15,000 dPa-s measured at 125° C.

16. The process of claim 15 wherein said compatible acrylic resin is polymethly-methacrylate.

17. The process of claim 16 wherein the weight ratio of terpolymer to compatible resin is about 70:30.

18. A process for making and applying a powder coating having controlled gloss properties, said method comprising:
   (a) providing a powder coating product prepared by physically blending a mixture of:
      (i) a resin consisting essentially of from 60 to 90 wt. % of at least one fluorine-based terpolymer having a melting point less than 150° C. and from 40 to 10 wt.

% of at least one compatible thermoplastic acrylic resin physically mixed with said terpolymer to provide a product which has temperature-dependent gloss characteristics in which the product, when baked on a substrate surface at a first designated temperature within the range of 140–220° C., produces a first gloss characteristic when measured in accordance with ISO-2813 at an angle of 60° and when baked on a substrate surface at a second temperature within the range of 140° C. and 220° C. and greater than said first designated temperature exhibits a second gloss characteristic when measured at 60° C. in accordance with ISO-2813 which is less than said first designated gloss characteristic; and.

(b) applying the powder coating product of Paragraph (a) to a substrate surface; and (c) baking the powder coating product on the substrate surface of Paragraph (b) at a designated baking temperature and selecting said designated banking temperature at a value within said temperature interval to produce a selected gloss.

19. The process of claim 18 wherein the terpolymer is prepared from 65 to 85 wt. % of vinylidene fluoride monomer from 7.5 to 17.5 wt. % of tetrafluorethylene monomer and from 7.5 to 17 wt. % of hexafluoropropene monomer.

* * * * *